US010239295B2

(12) United States Patent
Muslet et al.

(10) Patent No.: US 10,239,295 B2
(45) Date of Patent: Mar. 26, 2019

(54) ELASTOMERIC FILMS HAVING INCREASED TEAR RESISTANCE

(71) Applicant: Clopay Plastic Products Company, Inc., Mason, OH (US)

(72) Inventors: Iyad Muslet, West Chester, OH (US); Kevin Preston, Mainville, OH (US)

(73) Assignee: Berry Film Products Company, Inc., Evansville, IN (US)

( * ) Notice: Subject to any disclaimer, the term of this patent is extended or adjusted under 35 U.S.C. 154(b) by 422 days.

(21) Appl. No.: 14/989,840

(22) Filed: Jan. 7, 2016

(65) Prior Publication Data

US 2016/0200080 A1 Jul. 14, 2016

Related U.S. Application Data

(60) Provisional application No. 62/101,815, filed on Jan. 9, 2015.

(51) Int. Cl.
| | |
|---|---|
| *B32B 27/32* | (2006.01) |
| *B32B 27/34* | (2006.01) |
| *B32B 7/02* | (2006.01) |
| *B32B 25/08* | (2006.01) |
| *B32B 25/14* | (2006.01) |
| *B32B 27/08* | (2006.01) |
| *B32B 27/30* | (2006.01) |

(52) U.S. Cl.
CPC ............... *B32B 27/32* (2013.01); *B32B 7/02* (2013.01); *B32B 25/08* (2013.01); *B32B 25/14* (2013.01); *B32B 27/08* (2013.01); *B32B 27/302* (2013.01); *B32B 27/308* (2013.01); *B32B 27/34* (2013.01); *B32B 2250/05* (2013.01); *B32B 2250/24* (2013.01); *B32B 2250/40* (2013.01); *B32B 2270/00* (2013.01); *B32B 2274/00* (2013.01); *B32B 2307/50* (2013.01); *B32B 2307/51* (2013.01); *B32B 2307/5825* (2013.01); *B32B 2307/718* (2013.01); *B32B 2410/00* (2013.01); *B32B 2437/00* (2013.01); *B32B 2535/00* (2013.01); *B32B 2555/02* (2013.01); *B32B 2571/00* (2013.01)

(58) Field of Classification Search
CPC ............ B32B 2250/05; B32B 2250/24; B32B 2250/40; B32B 2270/00; B32B 2274/00; B32B 2307/50; B32B 2307/51; B32B 2307/5825; B32B 2307/718; B32B 2410/00; B32B 2437/00; B32B 2535/00; B32B 2555/02

See application file for complete search history.

(56) References Cited

U.S. PATENT DOCUMENTS

| | | |
|---|---|---|
| 5,354,597 A | 10/1994 | Capik et al. |
| 5,501,579 A | 3/1996 | Kimura et al. |
| 6,376,095 B1 * | 4/2002 | Cheung .................. B32B 25/14 428/516 |
| 6,472,084 B1 | 10/2002 | Middlesworth et al. |
| 6,869,666 B2 | 3/2005 | Deeb et al. |
| 7,498,282 B2 | 3/2009 | Patel et al. |
| 7,510,758 B2 | 3/2009 | Thomas et al. |
| 7,629,278 B2 | 12/2009 | Sabbagh et al. |
| 7,737,215 B2 | 6/2010 | Chang et al. |
| 7,833,211 B2 | 11/2010 | Mansfield |
| 8,177,766 B2 | 5/2012 | Mansfield |
| 8,317,767 B2 | 11/2012 | Vukos et al. |
| 8,460,263 B2 | 6/2013 | Mansfield |
| 8,603,059 B2 | 12/2013 | Mansfield |
| 8,795,809 B2 | 8/2014 | Mansfield |
| 8,937,211 B2 | 1/2015 | Dent et al. |
| 8,940,959 B2 | 1/2015 | Liu |
| 9,056,975 B2 | 6/2015 | Chapman et al. |
| 9,358,759 B2 | 6/2016 | Lee et al. |
| 2006/0147686 A1 * | 7/2006 | Ausen .................. B29C 47/065 428/212 |
| 2006/0286386 A1 | 12/2006 | Sabbagh et al. |

(Continued)

FOREIGN PATENT DOCUMENTS

WO 2011/019504 2/2011

OTHER PUBLICATIONS

PCT, International Search Report and Written Opinion, International Application No. PCT/US2016/012595, 10 pages, dated Apr. 15, 2016.

*Primary Examiner* — Lawrence D Ferguson

(74) *Attorney, Agent, or Firm* — Barnes & Thornburg LLP

(57) ABSTRACT

Split-layer thermoplastic films having the structure A-(B-C)$_n$-B-A, wherein A and C are inelastic layers each having a thickness and each comprising individually at least one of polymeric compositions A and C; B is an elastic layer comprising polymeric composition B, n≥1, and wherein the layers comprising (B-C)$_n$-B have a combined thickness x, polymeric compositions A and C comprise an inelastic polymer; polymeric composition B comprises an elastomeric polymer; and the thickness of C comprises 5% or less of the total thickness of the film; and further wherein the film has a notched Elmendorf tear strength of at least twice the notched Elmendorf tear strength of a comparative thermoplastic film having the structure A-B-A, wherein A and B comprise substantially the same polymeric compositions A and B as the thermoplastic film, and wherein the B-layer of the comparative thermoplastic film has a thickness y which is substantially equal to x.

22 Claims, 7 Drawing Sheets

(56) References Cited

U.S. PATENT DOCUMENTS

| | | |
|---|---|---|
| 2008/0254281 A1 | 10/2008 | Chen et al. |
| 2009/0258210 A1 | 10/2009 | Iyad et al. |
| 2010/0062231 A1 | 3/2010 | Abed et al. |
| 2011/0020615 A1 | 1/2011 | Van Den Bossche et al. |
| 2012/0208420 A1 | 8/2012 | Mansfield |
| 2013/0253463 A1 | 9/2013 | Mansfield |
| 2014/0027220 A1 | 1/2014 | Handke et al. |
| 2014/0041786 A1 | 2/2014 | Henke et al. |
| 2014/0045401 A1 | 2/2014 | Kunihiro et al. |
| 2014/0066877 A1 | 3/2014 | Mansfield |
| 2014/0255658 A1 | 9/2014 | Muslet et al. |
| 2014/0257219 A1 | 9/2014 | Neton et al. |
| 2014/0329053 A1 | 11/2014 | Baldauf et al. |
| 2014/0330232 A1 | 11/2014 | Schonbeck et al. |
| 2014/0378924 A1 | 12/2014 | Turner et al. |
| 2015/0088088 A1 | 3/2015 | Wade et al. |
| 2015/0104627 A1 | 4/2015 | O'Donnell et al. |
| 2015/0126954 A1 | 5/2015 | Sauer et al. |
| 2015/0132515 A1 | 5/2015 | Hernandez et al. |
| 2015/0147539 A1 | 5/2015 | Thomas et al. |
| 2015/0148763 A1 | 5/2015 | Xu et al. |

\* cited by examiner

ELASTOMERIC FILMS HAVING INCREASED TEAR RESISTANCE

RELATED APPLICATIONS

This application claims the benefit of priority of U.S. Provisional Patent Application No. 62/101,815, filed Jan. 9, 2015, and incorporated herein by reference.

FIELD OF THE INVENTION

The present invention is directed to multilayer thermoplastic films and laminates having improved tear resistance, as well as to laminates and articles incorporating said films, and methods of making.

BACKGROUND OF THE INVENTION

Elastomeric materials are used in garments to provide a snug but comfortable fit that conforms to the body. A snug fit is especially important in disposable hygienic products such as diapers, to prevent the leakage of body fluids.

One disadvantage of elastomeric films is the high propensity to tear if the film is cut, notched, or perforated. Therefore, manufacturers may use relatively thick elastomeric films to reduce the formation of "activation defects," e.g., pinholes, slits, etc., which may lead to leakage. In addition, it is desirable to produce laminates that are both stretchable and recoverable, which means that the product returns to substantially its original shape after being stretched. This is particularly desirable, for example, in elastic cuffs in disposable diapers.

There exist non-woven and elastomer materials that, when used in the production of elastomeric laminates, help to decrease the number of activation defects. Examples include carded and spun-lace non-wovens, and specialty elastomers such as SEBS and SEEPS. When used in current methods, however, these materials tend to be cost-prohibitive, in particular for use in disposable hygiene products.

A need exists, therefore, for elastomeric films and laminates which are highly resistant to activation pinholes, exhibit superior elastic properties, and are cost-effective to produce.

SUMMARY OF THE INVENTION

The present invention meets the aforementioned needs and improves upon the existing state of the art by providing in one embodiment novel, co-extruded split-layer elastomeric films having the structure A-(B-C)$_n$-B-A, where n is at least 1, and wherein B is an elastic layer and A and C are relatively inelastic layers. Applicants have unexpectedly discovered that when the C-layers each are not allowed to exceed 5% of the total thickness of the film, the films exhibit surprisingly superior tear strength relative to a comparative film. In addition, the films and laminates comprising such films are cost-effective, exhibit superior elastic properties, are substantially free of activation defects, and have a soft and quiet feel.

A split-layer film is a particular type of multi-layer film, and is distinguished by virtue of the core layers comprising (B-C)$_n$-B. In the present invention, elastic layer B is effectively split into two layers by intervening layer C, which is less elastic than layer B or even inelastic. The core layers (B-C)$_n$-B are referred to as "split" because they have the same thickness as core layer B in a comparative three-layer film having the structure ABA.

Whereas films labeled "split-layer" are known, no distinction has been made between a split-layer film and a conventional multi-layer film. More important, the relationship between the maximum thickness of the inner C-layer(s) to the film strength was previously not appreciated. It was discovered, however, in the films of the present invention, that when the thickness of the inner C-layer is not allowed to exceed a given maximum, the films exhibit an Elmendorf tear force that is significantly greater than that of comparative films. In addition, the films of the present invention are particularly resistant to activation pinholes and have good permanent set properties.

The elastomeric laminates of the present invention exhibit other unexpected benefits. For example, the laminates comprising the multilayer elastomeric film can be activated during manufacturing by a deeper depth of engagement (DOE), and therefore achieve higher stretchability. The polymeric compositions used in the films of the present invention can improve the film processability, allowing higher line speeds and lower film basis weights. Extrusion lamination of the films onto one or more nonwovens can be done at very low film basis weights.

In one embodiment, the present invention provides split-layer thermoplastic films having the structure A-(B-C)$_n$-B-A, wherein A and C are inelastic layers each having a thickness and each comprising individually at least one of polymeric compositions A and C; B is an elastic layer comprising polymeric composition B, and n≥1, and wherein the layers comprising (B-C)$_n$-B have a combined thickness x, polymeric compositions A and C comprise an inelastic polymer; polymeric composition B comprises an elastomeric polymer; the thickness of C comprises 5% or less of the total thickness of the film; and, wherein the film has a notched Elmendorf tear strength of at least twice the notched Elmendorf tear strength of a comparative thermoplastic film having the structure A-B-A, wherein A and B comprise substantially the same polymeric compositions A and B as the thermoplastic film, and wherein the B-layer of the comparative thermoplastic film has a thickness y which is substantially equal to x.

In an alternative embodiment, an elastomeric laminate is provided comprising a split-layer elastomeric film of the present invention and at least one substrate.

In yet another alternative embodiment, article of manufacture is provided comprising a split-layer thermoplastic film having the structure A-(B-C)$_n$-B-A, wherein A and C are inelastic layers each having a thickness and each comprising individually at least one of polymeric compositions A and C; B is an elastic layer comprising polymeric composition B, and n≥1, and wherein the layers comprising (B-C)$_n$-B have a combined thickness x, polymeric compositions A and C comprise an inelastic polymer; polymeric composition B comprises an elastomeric polymer; the thickness of C comprises 5% or less of the total thickness of the film; and, wherein the film has a notched Elmendorf tear strength of at least twice the notched Elmendorf tear strength of a comparative thermoplastic film having the structure ABA, wherein A and B comprise substantially the same polymeric compositions A and C as the thermoplastic film, and wherein the B-layer of the comparative thermoplastic film has a thickness y which is substantially equal to x. In one embodiment, the article of manufacture is a personal hygiene product, such as a disposable absorbent product.

In yet another alternative embodiment, a method of making a split-layer elastomeric film is provided, comprising providing a first polymeric composition A, a second polymeric composition B, and a third polymeric composition C, wherein polymeric compositions A and C comprise a suitable inelastic polymer, and wherein polymeric composition B comprises a suitable elastomeric polymer; and coextruding polymeric compositions A, B, and C to form at least one split-layer elastomeric film having a structure described herein. Optionally, the method comprises the step of laminating a substrate to the film to produce an elastomeric laminate.

Other embodiments and advantages of the invention will be apparent in view of the following detailed description of the invention.

DETAILED DESCRIPTION OF THE INVENTION

Definitions

Figure 2A:
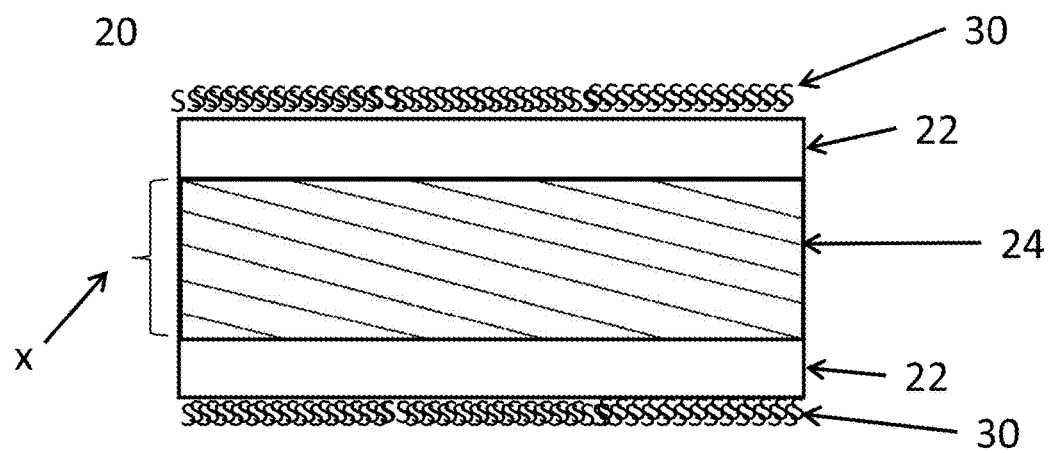
FIG. 2a is a cross-sectional view of a coextruded 3-layer film according to the present invention.
Figure 2B:
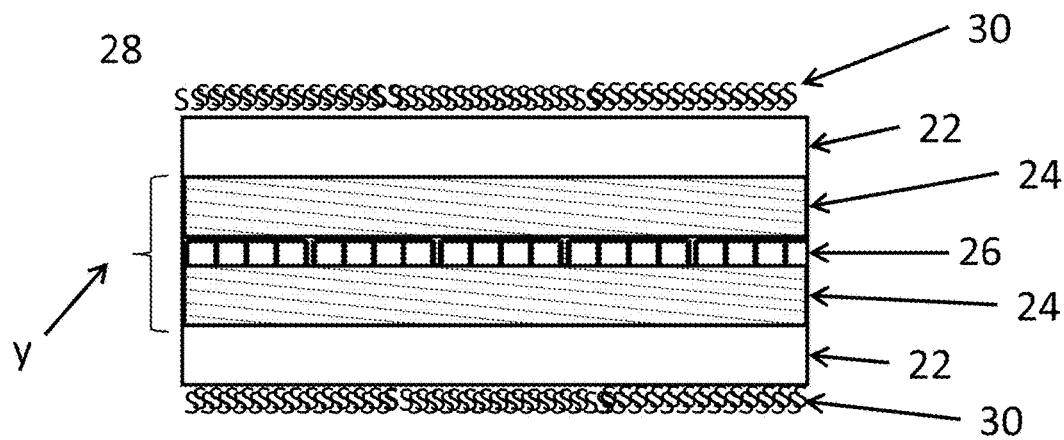
FIG. 2b is a cross-sectional view of a 5-layer coextruded extruded film made according to the present invention demonstrating a split-layer.

As used herein:

"Split-layer" means a type of multi-layer film in which an inner, or core, layer having a given thickness "x" is divided into multiple layers by one or more intervening layers having elastomeric properties different than the single core layer, to produce a multilayered core having a total thickness "y," which is substantially equal to "x." See FIGS. 2a and 2b. "Substantially equal to" is understood herein to mean that the value of x is within about 20% of the value of y.

"Coextruded," "coextrusion," or variants thereof mean a process of making multilayer polymer films wherein each polymer or polymer blend comprising a layer of the film is melted individually. The molten polymers may be layered inside the extrusion die, and the layers of molten polymer films are extruded from the die essentially simultaneously. Coextruded films do not require a layer of adhesive between the individual coextruded layers.

"Elastomeric," "elastomer," "elastic," or variants thereof mean a film, a laminate, a polymeric composition or material used in a film layer, such that when the film or laminate comprising the material is stretched by at least two and a half times the original length, recovers to no more than about 1.2 times the original length in the direction of the applied stretching force. For example, an elastomeric film that is 10 cm long can be stretched to at least 25 cm under a suitable stretching force, and then retract to no more than about 12 cm when the stretching force is removed.

"Permanent set" is the permanent deformation of a material after removal of an applied load. In the case of elastomeric films, permanent set is the increase in length of a sample of a film after the film has been stretched to a given length and then allowed to relax as described in the Two Cycle Hysteresis Test. Permanent set is typically expressed as a percent increase relative to the original size.

"Polyethylene rich," or alternatively, "polyethylene-based," means a polymeric composition comprising at least about 60% by weight of polyethylene monomers. "Polyethylene rich" or "polyethylene-based" is not understood to include polymers comprising mixtures of ethylene and propylene monomers, such as poly(ethylene-propylene).

"Polypropylene rich," or alternatively, "polypropylene-based," means a polymeric composition comprising at least about 60% by weight of polypropylene monomers. "Polypropylene rich" or "polypropylene-based" is not understood to include polymers comprising mixtures of ethylene and propylene monomers, such as poly(ethylene-propylene).

"Inelastic" means a film, a laminate, a polymeric composition or material used in a film layer a film layer that falls outside of the scope of "elastic," as defined herein. An inelastic film or laminate comprising an inelastic material either may not be stretched by at least two and a half times the original length without tearing or otherwise failing, or fails to recover to no more than about 1.2 times the original length after removal of an applied stretching force.

"Gsm" means grams per square meter, and is a measure of the basis weight, which is an industry standard term that quantifies the thickness or unit mass of a film or laminate product.

"Skin layer(s)" means one or both outer layers of a multilayer film that functions as an outer surface of the film. In the present invention, the A-layer may be referred to as a skin layer.

"Layer A" or "the A-layer" mean a discrete layer and/or sublayer of film comprising an polymeric composition A. Similarly, "layer B," or "the B-layer," mean a discrete layer and/or sublayer of the film comprising polymeric composition B. "Layer C," or "the C-layer," mean a discrete layer and/or sublayer of the film comprising polymeric composition C.

"Activation," or "activating," or variants thereof, means a process by which the elastomeric film or material is rendered more easily stretchable. An elastomeric material that has undergone activation is called "activated."

"Activation defect" means small holes (pinholes) or tears in a film while the film undergoes formation, lamination, activation, or other manufacturing or processing steps, which in turn may lead to reduced tear strength, porosity, leakage or other undesirable characteristics.

"Tear strength," "tear force," "Elmendorf tear strength," or similar terms mean the force required to tear a film. Herein, tear strength is expressed in units of grams and is measured by the Elmendorf tear test, ASTM D-1922, incorporated herein by reference, which may be used with either a notched or an unnotched film. It is noted that tear strength is related to film thickness, and for the sake of clarity, any comparison thereof must take into account the relative basis weight of the comparative sample. Tear strength may be specified to be in the cross direction or in the machine direction. When no direction is specified, the tear strength is understood to refer to either the cross direction and/or the machine direction.

Elastomeric Film

The elastomeric films of the present invention have the general structure A-(B-C)$_n$-B-A, wherein A, B and C represent individual layers comprising, respectively, polymeric compositions A, B and C and n≥1. Polymeric compositions A and C may be substantially the same or different. A, B and C each may be either elastic or inelastic. The layers further may be alternately elastic and inelastic, as defined herein.

In one embodiment, A and C are inelastic layers, and B is an elastic layer. The individual A layers and individual C layers may comprise the same or different polymeric compositions, provided the polymeric compositions are a suitable inelastic polymeric composition, as defined herein. The B layers, however, contain the same polymeric composition as the B layer in a comparative film.

It is to be understood that for the purposes of the present invention, that a layer, whether an A-, a B- or a C-layer, means a given thickness of film that is comprised of substantially the same polymeric composition. In other words, a B-layer may comprise sub-layers of polymeric composition B, and these layers may even be visibly distinct; however, whether comprised of a continuous layer or of distinguishable sub-layers, it is the elastic properties that define a layer. For the purposes of this invention, the addition of plasticizers, fillers, compatibilizing agents and/or stabilizers is insufficient in and of itself to distinguish a layer.

The value of "n" is at least 1, alternatively is from 1 to about 4, alternatively is from 1 to 3, alternatively is 1, and alternatively is 2.

The films may have a thickness of from about 10 gsm to about 100 gsm, alternatively from about 10 gsm to about 50 gsm, alternatively from about 10 gsm to about 25 gsm, alternatively a thickness of less than 25 gsm, and alternatively a thickness of greater than 25 gsm.

In the films of the present invention, the permanent set may be about 20% or less, alternatively about 15% or less, alternatively about 10% or less, alternatively is from about 1% to about 10%, and alternatively is from about 1% to about 5%.

In the films of the present invention, the Elmendorf tear strength is at least twice the tear strength of a comparative film, and alternatively may have at least three times, five times or seven times the strength of a comparative film having the structure ABA, in which the thickness of B is substantially equal to the thickness of (B-C)$_n$, and in which B is substantially the same polymeric material.

A notched or unnotched film may be characterized by an MD Elmendorf tear force in the cross direction or in the machine direction, relative to a film having a basis weight of about 50 gsm, of at least about 300 g, alternatively at least about 400 g, alternatively at least about 500 g, alternatively at least about 600 g, alternatively from about 300 g to about 1200 g, and alternatively from about 400 g to about 700 g.

When the film is unnotched, the film may be characterized by an Elmendorf tear force, relative to a film having a basis weight of about 50 gsm, in the machine direction (an "MD tear force") of at least about 300 g, alternatively at least about 500 g, alternatively at least about 1000 g, and alternatively from about 300 g to about 1500 g. When the film is unnotched, the film may be characterized by an Elmendorf tear force, relative to a film having a basis weight of about 50 gsm, in the cross direction (a "CD tear force") of at least about 1300 g, and alternatively of from about 1300 g to about 2000 g.

The thickness of the C-layer, or of each individual C-layer when n>1, is about 5% or less of the total thickness of the film, alternatively is about 2% or less of the total thickness of the film and alternatively is less than about 1% of the total thickness of the film.

The films of the present invention may have a low weight ratio of inelastic to elastic material. In one embodiment, the weight ratio of inelastic material to elastic material is from about 1 to about 4.

In one embodiment, the multilayered elastomeric films and laminates of the present invention are substantially free of activation defects.

In one embodiment, the elastomeric films and any or all of the individual layers of the present invention are substantially free of plastoelastic polymers.

Polymeric Compositions

The A-, B- and C-layers of the elastomeric film of the present invention comprise, respectively, polymeric compositions A, B and C, which also may be referred to, respectively, as first, second and third polymeric compositions. When A and C are inelastic layers, polymeric compositions A and C may comprise an inelastic polymer, including but not limited to polyolefins, styrenic polymers, acrylic polymers, polyamides, and mixtures thereof. In one embodiment, the inelastic polymer comprises polyethylene, polypropylene and homopolymers and copolymers thereof, polyethylene-rich polymeric compositions, polypropylene-rich polymeric compositions, and mixtures thereof. In one embodiment, polymeric compositions A and C may comprise linear low density polyethylene (LLDPE), low density polyethylene (LDPE), high density polyethylene (HDPE), homopolymer polypropylene (hPP), polypropylene, polyethylene, polystyrene, high impact polystyrene, polymers and copolymers of any of the above, vinyl acetate (EVA), methyl acrylate (EMA), ethyl acrylate (EEA), ethyl acrylic acid (EAA), and mixtures thereof. Nonlimiting examples of commercially available suitable polymeric compositions include INFUSE, available from The Dow Chemical Company of Midland, Mich., and VISTAMAXX, one example of which is VISTAMAXX 6102, available from ExxonMobil Chemical Company of Houston, Tex. Other suitable polymeric compositions include olefinic polymers, including olefinic block copolymers, polyolefins, olefinic random copolymers, polyurethanes, rubbers, vinyl arylenes and conjugated dienes, polyesters, polyamides, polyethers, polyisoprenes, polyneoprenes, copolymers of any of the above, and mixtures thereof. In addition, polymeric compositions A and C may comprise brittle polymers, nonlimiting examples of which are disclosed in U.S. Pat. No. 7,879,452.

The aforementioned polymeric compounds may be present in polymeric compositions A and/or C in an amount of from about 0% to about 95%, alternatively from about 0% to about 40%, alternatively from about 10% to about 50%, alternatively from about 35% to about 50%, alternatively from about 20% to about 40%, and alternatively from about 10% to about 20%. It is noted, however, that to form an inelastic layer, the percentage of polyethylene-rich and/or polypropylene-rich polymeric compositions, such as VISTAMAXX or INFUSE or other polymeric compositions that may be considered elastomeric in a substantially pure form, should be less than about 40% of the total polymeric composition in a film or layer.

When B is an elastic layer, polymeric composition B may comprise an elastomeric polymer, including but not limited to styrenic block copolymers, elastomeric olefinic block copolymers, and combinations thereof. Non-limiting examples of suitable styrenic block copolymers (SBC's) include styrene-butadiene-styrene (SBS), styrene-isoprene-styrene (SIS), styrene-ethylene-butylene-styrene (SEBS), styrene-ethylene-propylene (SEP), styrene-ethylene-propylene-styrene (SEPS), or styrene-ethylene-ethylene-propylene-styrene (SEEPS) block copolymer elastomers, polystyrene, high impact polystyrene, and mixtures thereof. In one embodiment, polymeric composition B comprises styrene-butadiene-styrene, polystyrene, high impact polystyrene, and mixtures thereof. In one embodiment, polymeric composition B comprises styrene-butadiene-styrene. In one embodiment, the B-layers are substantially free of polyolefin-grafted polyurethane elastomers. Non-limiting examples of suitable SBC resins include DEXCO DPX620, also sold as VECTOR 7620, available from Dexco Polymers LP of Planquemine, La., and GLS 359-145A, available from PolyOne Corporation, McHenry, Ill.

The aforementioned elastomeric polymers may be present in polymeric composition B in an amount of from about 0% to about 96%, alternatively from about 50% to about 96%, and alternatively from about 75% to about 95%. In one embodiment, the polymeric composition B comprises polystyrene, high impact polystyrene, or mixtures thereof, in an amount of from about 0% to about 45%, alternatively from about 0% to about 20%, alternatively from about 5% to about 45%, and alternatively from about 5% to about 15%.

In one embodiment, the A-, B- and/or C-layers may be substantially free of block copolymers comprising vinyl arylene and conjugated dienes, natural rubber, polyurethane, polyester rubber, polyamides, polyethers, polyisoprenes, polyneoprenes, or mixtures thereof.

The polymeric compositions A, B and C of the present invention may include optional components, such as fillers, plasticizers, compatibilizers, draw down polymers, processing aids, anti-blocking agents, viscosity-reducing polymers, and the like. Other additives may include pigments, dyes, antioxidants, antistatic agents, slip agents, foaming agents, heat or light stabilizers, UV stabilizers, and the like. Examples of suitable processing aids and anti-blocking agents include, but are not limited to, AMPACET, available from Ampacet Corporation, Cincinnati, Ohio. In one embodiment, the polymeric compositions may comprise from about 0% to about 40%, and alternatively from about 5% to about 10%, of an anti-blocking agent. In one embodiment, the polymeric compositions may comprise from about 0% to about 15%, and alternatively from about 0% to about 10%, and alternatively from about 1% to about 5%, of a suitable processing aid.

Figure 1A:
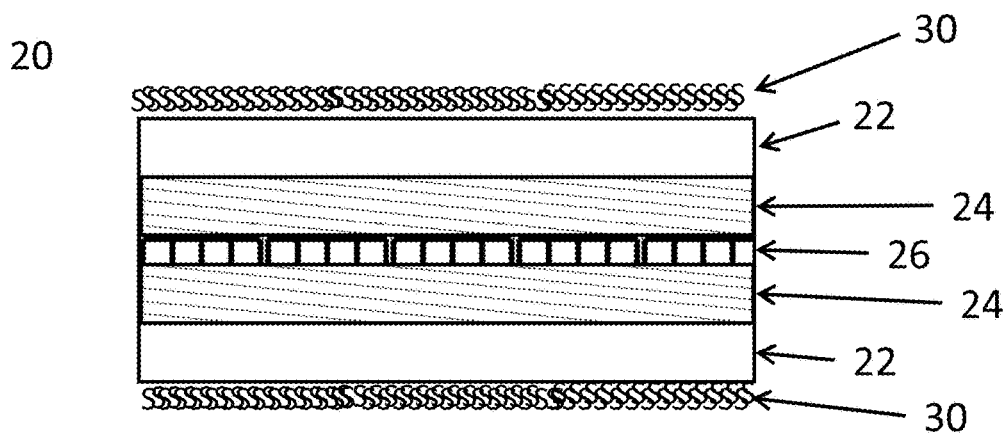
FIG. 1a is a cross-sectional view of a 5-layer coextruded elastomeric film according to the present invention.
Figure 1B:
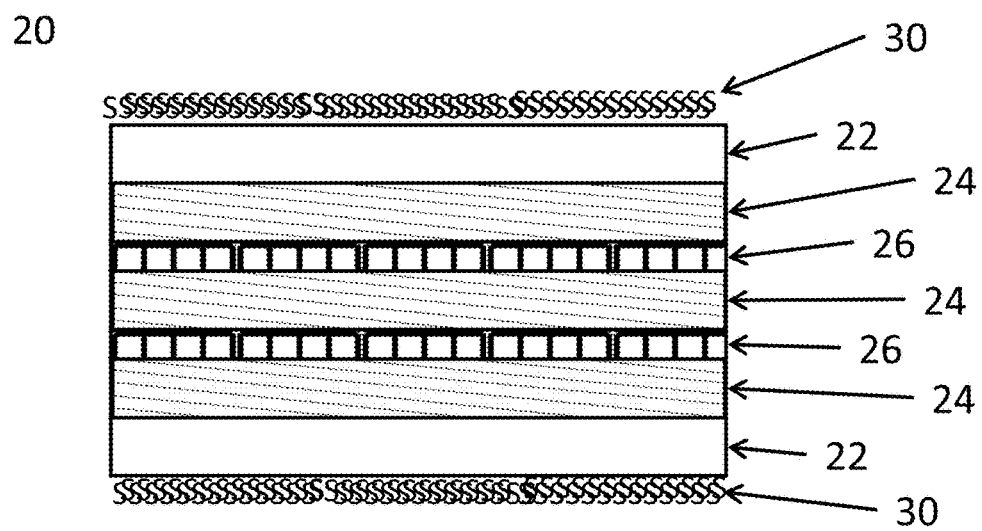
FIG. 1b is a cross-sectional view of a 7-layer elastomeric film made according to the present invention.
Figure 1C:
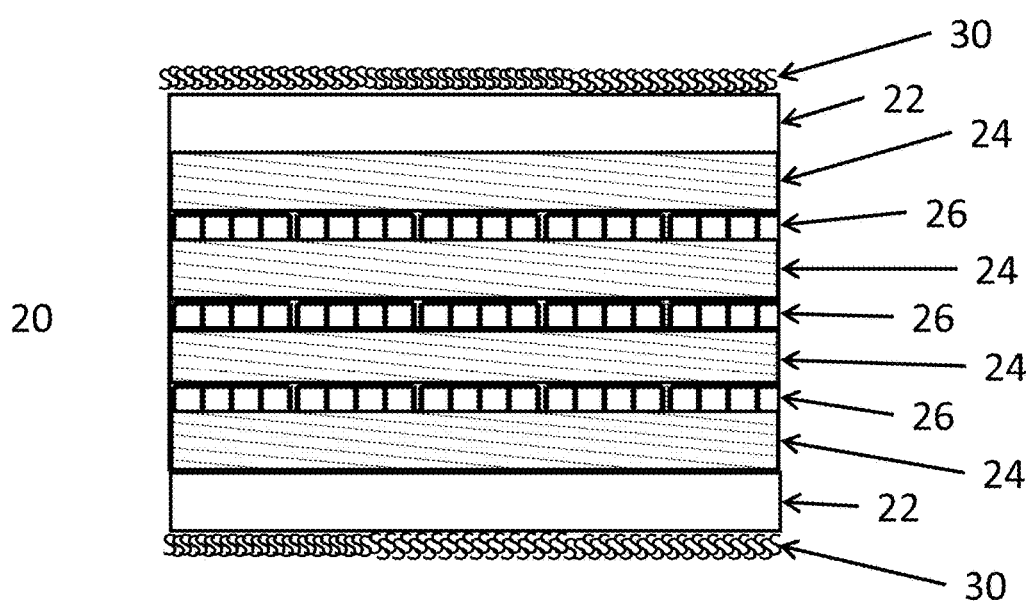
FIG. 1c is a cross-sectional view of a coextruded 9-layer elastomeric film made according to the present invention.

FIG. 1 illustrates several embodiments of elastomeric films and laminates of the present invention. FIG. 1a illustrates a coextruded five layer elastomeric film (20) having the structure A-B-C-B-A, showing A-layers (22), B-layers (24), and C-layer (26). FIG. 1b illustrates a coextruded seven layer elastomeric film 20 having the structure A-(B-C)$_n$-B-A (where n=2) comprising A-layers (22), B-layers (24), and C-layers (26). FIG. 1c illustrates a coextruded nine layer elastomeric film 20 having the structure A-(B-C)$_n$-B-A (where n=3) comprising A-layers (22), B-layers (24), and C-layers (26). All films may comprise optional substrate(s) 30 to form a laminate.

FIGS. 2a and 2b illustrate the split-layer concept. FIG. 2a illustrates a three-layer film having the structure ABA (20), showing A-layers (22), B-layer (24) and optional substrate(s) (30). The B-layer has a thickness "x." In FIG. 2b, the B-layer has been effectively split by intervening layer C (26) to create a five-layer film (28) having the structure ABCBA, comprising A-layers (22), B-layers (24) and optional substrate(s) (30), where B is elastic and A and C are inelastic. The total thickness of the B- and C-layers, y, is substantially equal to x.

Method of Making

The present invention provides methods of making the elastomeric films of the present invention, and comprises the steps of providing polymeric compositions A, B and C, and coextruding the polymer compositions A, B, and C to form the multilayer elastomeric film of the present.

The multilayered elastomeric films of the present invention are co-extruded films, and may be made by a number of methods that would be known to one of skill in the art, including cast co-extrusion and/or blown-film co-extrusion. In making the films of the present invention, the elastomer layers are extruded by a film casting procedure in which at least two extruders are used to coextrude the layers of the film. The layers are combined and split by a feedblock before the die. The feedblock is designed to divide the polymeric flow from each extruded polymer into specified layers, and then combine the layers from various extrusions in a specific arrangement. For example, two extruders A and B may divide A into 6 layers and B into five layers. The layers may then be arranged into a specified order, for example, A(BA)$_n$AB. The layers may be combined and split by a feedblock before the die or extruder through a multi-manifold die.

A typical cast extrusion process, suitable for making the multilayered elastomeric films of the present invention is described in published U.S. Patent Application 2014/0255658 (Muslet et al.). Polymeric compositions A, B and C may be melted in a conventional screw extruder and extruded from an extrusion die to form a molten polymer web. The molten polymer web is extruded into the nip between the illustrated metal roll and backing roll or onto a metal roll without a backing roll. The metal roll may be chilled to rapidly cool the molten polymer film. The metal roll may also be engraved with an embossing pattern if such a pattern is desired on the resulting film.

Laminates

The multilayer elastomeric films of the present invention may be laminated to a substrate to form a multilayer elastomeric laminate. Methods of forming elastomeric laminate would be well-known to one of skill in the art. Suitable lamination methods are described in U.S. Patent Application 2014/0255658 (Muslet et al.) and in U.S. Pat. No. 5,422,172 (Wu), and include but are not limited to adhesive lamination, extrusion lamination, ultrasonic bonding or welding, and other means that would be apparent to one of skill in the art. Elastic laminates may be mechanically activated by one or a combination of activating means, described, e.g., in U.S. Patent Application No. 2009/0264844 and including activating the web through intermeshing gears or plates, incremental stretching, ring rolling, tenter frame stretching, and activating the web in the machine direction between nips or roll stacks operating at different speeds. Incremental stretching rollers may be used to activate elastic laminates in the MD, CD, at an angle, or any combination thereof.

A variety of suitable substrates may be used in the laminate of the present invention. In one embodiment, the substrate is a non-woven. Examples of suitable nonwoven materials include carded, spunlaced nonwoven webs and spunbond nonwovens, including olefinic, styrenic, and acrylic non-wovens. In one embodiment, the non-woven is a spun bond non-woven, such as spunbond meltblown (SM), spunbond meltblown spunbond (SMS), spunbond meltblown meltblown spunbond (SMMS), and combinations of any of the aforementioned. In other embodiments, the non-woven may comprise layers of fibers that differ in diameter or composition, including but not limited to polyolefins such as polypropylene or polyethylene, polyesters, polyamides, polyurethanes, elastomers, rayon, cellulose, copolymers thereof, and combinations thereof. The nonwoven fabrics may also comprise fibers that are homogenous structures or comprise bicomponent structures such as sheath/core, side-by-side, islands-in-the-sea, segmented pie, and other known bicomponent configurations.

The substrate of the present invention may have a weight of about 5 gsm to 75 gsm, alternatively from about 10 gsm to about 50 gsm, alternatively from about 10 gsm to about 25 gsm, alternatively less than about 25 gsm and alternatively less than about 20 gsm.

Additional processing steps such as activating the elastomeric laminate, aperturing the laminate, printing the laminate, slitting the laminate, laminating additional layers to the laminate, and other such processes may be included.

Articles of Manufacture

The multilayer elastomeric laminates of the present invention are useful for a variety of purposes, including, for example, use in personal care products relating such as disposable absorbent products. Non-limiting examples include diapers, training pants, incontinence pads and pants, swimwear, sanitary napkins, tampons, pantiliners, etc. In one embodiment, the present invention is related to an absorbent article comprising the multilayer elastomeric laminate described herein. In one embodiment, the absorbent article is a diaper.

Other non-limiting examples of articles in which the laminates of the present invention may be used include protective outerwear garments used for protection in the workplace, such as surgical gowns, hospital gowns, covergowns, labcoats, masks, and protective coveralls, as well as protective covers and outercovers used to protect objects such as for example car, boat and barbeque grill covers, as well as agricultural fabrics.

Test Methods

Elmendorf Tear Test

Elmendorf tear strength was measured according to the following method. To determine the propagation tear resistance of notched and unnotched plastic film and laminates, the samples are cut accurately in each principle direction using the constant radius of tear template as shown in FIG. 1 of ASTM D-1922. For notched samples, a pre-cut slit is made in the sample as indicated in ASTM D-1922. For unnotched samples, no pre-cut slit is made. A Thwing Albert Model 60 Elmendorf Tearing Tester is used, as well as a pendulum having a 1600 g or 3200 g capacity, in the following procedure: The instrument is leveled such that the pendulum freely suspended from the vertical line on the sector exactly coincides with either edge of the pendulum stop. This adjustment is made using the level screw on the instrument base. Raise the pendulum to its initial position and set the pointer against the stop. With no specimen in the clamps, depress the pendulum stop and allow the pendulum to swing through with a complete arc. Catch the pendulum by hand on the return swing, taking care not to disturb the pointer position. If the pointer does not read zero on the pendulum scale, adjust the pointer stop with the thumbscrew provided and repeat steps 2 through 5 until a zero reading is obtained.

Raise the pendulum to its initial position, and place a specimen (multiple plies if necessary), horizontal plane seated, in the specimen clamps. Clamp the specimen in place using equal pressure on both clamps. Depress the knife handle to make a tear in the specimen unless the slit or tear was cut into the specimen at the time the specimen was cut using a constant radius template. Depress the pendulum stop and allow the pendulum to swing through a complete arc. Catch the pendulum by hand on the return swing, taking care not to disturb the pointer position. Record the pointer reading from the pendulum scale to the nearest half division if the obtained scale reading falls within 20% and 80% of full scale load. If the reading does not fall within 20% to 80% of full scale load, add multiple plies as necessary until obtained scale reading falls within 20% to 80% of full scale load. Also, if the tear deviates to one side or the specimen delaminates, note the occurrence and disregard the scale reading. Determine the average scale reading and calculate the force in grams corresponding to each average scale reading, dependent upon use of the 1600 g or 3200 g pendulum as follows:

$$\text{Force (g)} = \frac{\text{Average scale reading} \times 16}{\text{Number of plies}} (1600 \text{ g})$$

$$\text{Force (g)} = \frac{\text{Average scale reading} \times 32}{\text{Number of plies}} (3200 \text{ g})$$

Two Cycle Hysteresis Test

This method is used to determine properties that may correlate with the forces experienced by the consumer during application of the product containing the extrusion bonded laminate and how the product fits once it is applied.

The two cycle hysteresis test method is performed at room temperature (23.degree. C.+−0.2.degree. C.). The material to be tested is cut into a substantially rectilinear shape. Sample dimensions are selected to achieve the required strain with forces appropriate for the instrument. Suitable sample dimensions are approximately 25.4 mm wide by approximately 76.2 mm long. Shorter specimens may be used, however, if material availability precludes specimens 76.2 mm in length. The sample is selected and mounted such that the direction of elongation in the test method is perpendicular to the width of the sample, such that it can be elongated to a length of at least the maximum percent strain of the hysteresis test. Suitable instruments, grips, grip faces, software for data acquisition, calculations and reports and definition of percent strain are described in the Tensile Test (Mode II) method section above.

The load cell is selected so that the forces measured fall between 10% and 90% of the capacity of the load cell or the force range used. Typically a 25 N or 100N load cell is used. The fixtures and grips are installed. The instrument is calibrated according to the manufacturer's instructions. The distance between the line of gripping force (gauge length, as described in the Tensile test-Mode II) is 2.54 cm, which is measured with a steel ruler held beside the grips. The force reading on the instrument is zeroed to account for the mass of the fixture and grips. The samples are equilibrated at 23.degree. C.+−0.2.degree. C. for a minimum of one hour before testing. The mass, length and width of the specimen are measured before testing and are used to calculate the basis weight of the specimen in grams per square meter (gsm). A minimum of five samples is used to determine the average test values. The specimen is mounted into the grips in a manner such that there is minimal slack and the force measured is less than 0.02N. The first segment of the two cycle hysteresis test method is a gauge adjustment step using a 5 gram preload slack adjustment. The engineering tensile engineering strain.gamma..sub.tensile is defined in the Tensile Test Method section above and with a slack adjustment preload segment, $L_o$ is the adjusted gauge length, L is the stretched length and .gamma..sub.tensile is in units of percent. The Two Cycle Hysteresis Test is done using the following segments:

(1) Slack adjustment: Move the crosshead at 13 mm/min. until the specified 5 gf slack adjustment preload is achieved. The distance between the lines of gripping force at the 5 gf slack adjustment preload is the adjusted gauge length.

(2) Move the crosshead to achieve the specified percent engineering strain (i.e., engineering strain=130%) at a constant crosshead speed of 254 mm/min. For example, if the adjusted gauge length from segment 1 is 26.00 mm, the sample is stretched to 59.80 mm and the % engineering strain=((59.80/26.00)−1)*100=130%.

(3) Hold the sample for 30 seconds at the specified percent engineering strain (i.e., engineering strain=130%).

(4) Reduce engineering strain to 0% engineering strain (i.e., return grips to adjusted gauge length) at a constant crosshead speed of 254 mm/min.

(5) Hold the sample for 60 seconds at 0% engineering strain. (segments 1 to 5 complete Cycle 1)

(6) Repeat segments 2 through 5 to complete the second cycle of the Two Cycle Hysteresis Test.

The method reports Cycle 1 load forces at 100% engineering strain and 130% engineering strain (from segment 2), Cycle 1 unload force at 50% engineering strain and 30% engineering strain (from segment 4), percent set and force relaxation. The forces are reported in N/cm, where cm is the width of the sample. The percent set is defined as the percent engineering strain after the start of the second load cycle (from segment 6) where a force of 7 grams is measured (percent set load=7 grams). Force relaxation is the reduction in force during the hold in segment 3 and is reported as a percent. Percent force relaxation is calculated from the forces measured at 130% engineering strain during Cycle 1 and is equal to 100*[((initial force at 130% engineering strain)−(force at 130% engineering strain after the 30 second hold))/(initial force at 130% engineering strain)].

For different sample dimensions, the crosshead speed is adjusted to maintain the appropriate strain rate for each portion of the test. For example; a crosshead speed of 127 mm/min would be used in segments 2, 4 and 6 for a sample gauge length of 12.7 mm and a crosshead speed of 381 mm/min would be used in segments 2, 4 and 6 for a sample gauge length of 38.1 mm. Additionally, for samples with different widths, the slack preload force (5 grams per 2.54 cm width=1.97 g/cm) and the percent set load force (7 grams per 2.54 cm width=2.76 g/cm) must be adjusted for the different sample width. The Two Cycle Hysteresis Test may also be modified depending on the expected properties of the material tested. For example, if the sample is not capable of being elongated to 130% engineering strain without breaking, the sample is to be elongated to 100% engineering strain. And, if the sample is not capable of being elongated to 100% engineering strain, the sample is to be elongated to 70% engineering strain. In the latter two cases (elongation to 100% or 70% strain), force relaxation is determined at the maximum elongation of Cycle 1 as defined above for elongation of 130% engineering strain.

EXAMPLES

The following non-limiting examples are presented to illustrate embodiments of the present invention.

Multilayer Films

Comparative Example 1: 3-Layer Film

A coextruded multilayer film, having three layers and the structure A/B/A was prepared and tested for tear strength. The A-layers each comprised about 10% by weight of the film and the B-layer about 80%. The A-layers each comprised 47% Dow Elite 5230, 30% Total 3622, 14% Dow 640, 8% Ampacet 102795, 1% Ampacet 100458. The B-layer comprised 96% GLS359-145A and 4% Ampacet 612713. The film had a basis weight of about 50 gsm. The MD notched Elmendorf tear strength was about 150 g and the MD unnotched Elmendorf tear strength was about 800 g.

Example 1: 11-Layer Film

A coextruded multilayer elastomeric film of the present disclosure was prepared and tested for tear strength. The film comprised an eleven-layer elastomeric film having the structure A(BC)$_4$BA. The A- and C-layers of the film comprise 47% Dow Elite 5230, 30% Total 3622, 14% Dow 640, 8% Ampacet 102795, and 1% Ampacet100458. The B-layers comprise 96% GLS359-145A and 4% Ampacet 612713. The films had a basis weight of about 50 gsm.

The multilayer elastomeric film was coextruded such that the A layers each comprised about 6% of the total basis weight, the B layers each comprised about 16% of the total basis weight, and the C layers each comprised about 2% of the total basis weight. The MD notched Elmendorf tear strength was about 350 g; the MD unnotched Elmendorf tear strength was about 1150 g.

Example 2: 11-Layer Film

A coextruded multilayer elastomeric film of the present disclosure was prepared and tested for tear strength. The film comprised an eleven-layer elastomeric film having the structure A(BC)$_4$BA. The A- and C-layers of the film comprise 47% Dow Elite 5230, 30% Total 3622, 14% Dow 640, 8% Ampacet 102795, and 1% Ampacet100458. The B-layers comprise 86% Dexco DPX620, 10% Nova-Ineos 3190 and 4% Ampacet 612713. The film had a basis weight of about 50 gsm.

The multilayer elastomeric film was coextruded such that the A layers each comprised about 6% of the total basis weight, the B layers each comprised about 16% of the total basis weight, and the C layers each comprised about 2% of the total basis weight. The MD notched Elmendorf tear strength was about 500 g and the MD unnotched Elmendorf tear strength was about 1350 g.

Example 3: 11-Layer Film

A coextruded multilayer elastomeric film of the present disclosure was prepared and tested for tear strength. The film comprised an eleven-layer elastomeric film having the structure A(BC)$_4$BA. The A- and C-layers of the film comprise 47% Dow Elite 5230, 30% Total 3622, 14% Dow 640, 8% Ampacet 102795, 1% Ampacet 100458. The B-layers comprise 86% Dexco DPX620, 10% Nova-Ineos 3190 and 4% Ampacet 4700165N. It is noted that Ampacet 4700165N has polypropylene carrier instead of polystyrene, as in Ampacet 612713. The films had a basis weight of about 50 gsm.

The multilayer elastomeric film was coextruded such that the A layers each comprised about 6% of the total basis weight, the B layers each comprised about 16% of the total basis weight, and the C layers each comprised about 2% of the total basis weight. The MD notched Elmendorf tear strength was about 420 g and the MD unnotched Elmendorf tear strength was about 1300 g.

Examples 1, 2 and 3 exhibited significantly increased tear strength relative to comparative sample 1. Comparative example 1 further exhibited a significant number of activation defects, whereas the 11-layer films of Examples 1, 2 and 3 exhibited substantially no activation defects.

Split-Layer Films

Coextruded multilayer films were prepared and tested for tear strength. All films had a basis weight of about 50 gsm. In all films, the A layers each comprised about 6% by weight of the film; the percentages of layers B and C were varied as described below. In all samples, the total thickness of inner BCB and/or BCBCB layers had the same thickness as the B-layer in comparative 3-layer samples. Inelastic layers A and C each comprised about 47% LLDPE (Nova 317, which is a functional equivalent of Dow 5230), 30% hPP (homopolymer polypropylene, Total 3622), 14% LDPE (Dow 640), 8% Antiblock Masterbatch (Ampacet 102785) and 1% processing aid (Ampacet 100458). The elastic B-layers comprised about 86% SBS (Dexco 7620, formerly DPX620); 10% polystyrene (Nova-Ineos 3190), and 4% White Masterbatch (Ampacet 612713).

Comparative Example 2: 3-Layer Film

A 3-layer film was made, having the structure A/B/A. The A-layers each comprised about 6% of the total film thickness, and the B-layer about 88% of the total weight of the film. For a 50 gsm film, therefore, the A-layers were each about 3 gsm, and the B-layer was about 44 gsm. The film exhibited an MD notched Elmendorf tear strength of about 200 g; an MD unnotched Elmendorf tear strength of about 845 g; a CD notched Elmendorf tear strength of about 100 g and a CD unnotched Elmendorf tear strength of about 1300 g. The film further exhibited a tensile strength prior to being stretched of about 3.3N, and after stretching to about 200% of its original length of about 1.9N.

Example 4: Split-Layer Films Comprising Five Layers, with Varying Thickness of Inner Layer Five-layer films having the structure A/B/C/B/A having the composition and characteristics described above were made and tested for strength. In all films, the A-layers each comprised about 6% of the total film basis weight, or about 3 gsm. The thickness of the C-layer varied from about 1.7% to about 23.8%. The B-layers formed the remainder of the film basis weight, and were adjusted accordingly. The combined thickness of the B-C-B layers was about 44 gsm.

Figure 3:
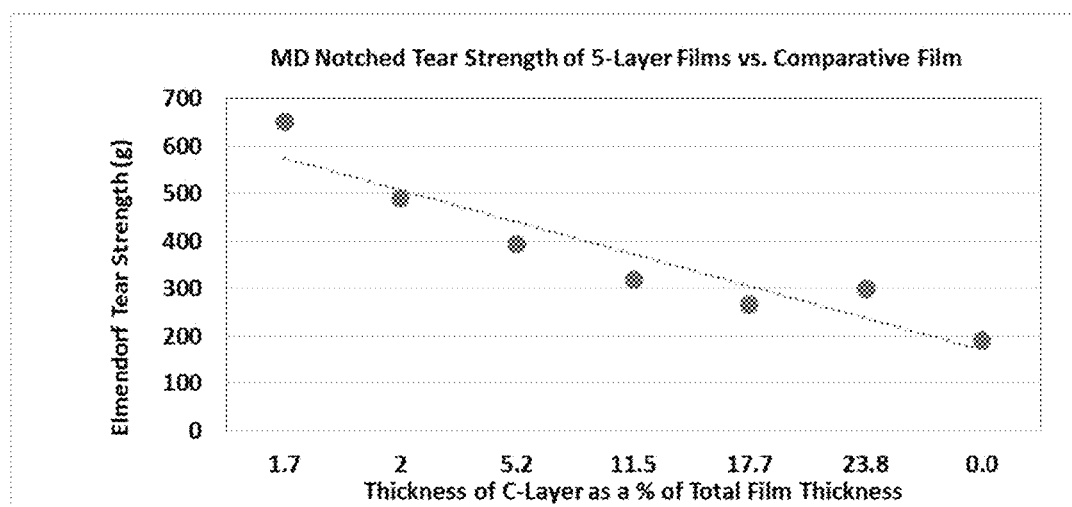
FIG. 3 depicts the machine-direction (MD) notched Elmendorf tear strength in grams (y-axis) of split-layer films, as defined herein. A 5-layer film having the structure ABCBA is compared to a comparative 3-layer film having the structure ABA. The thickness of the C-layer is varied from about 1.7% to about 23.8% and is absent (0%) in the 3-layer film, and is represented as a percentage of the total film thickness on the x-axis.
Figure 4:
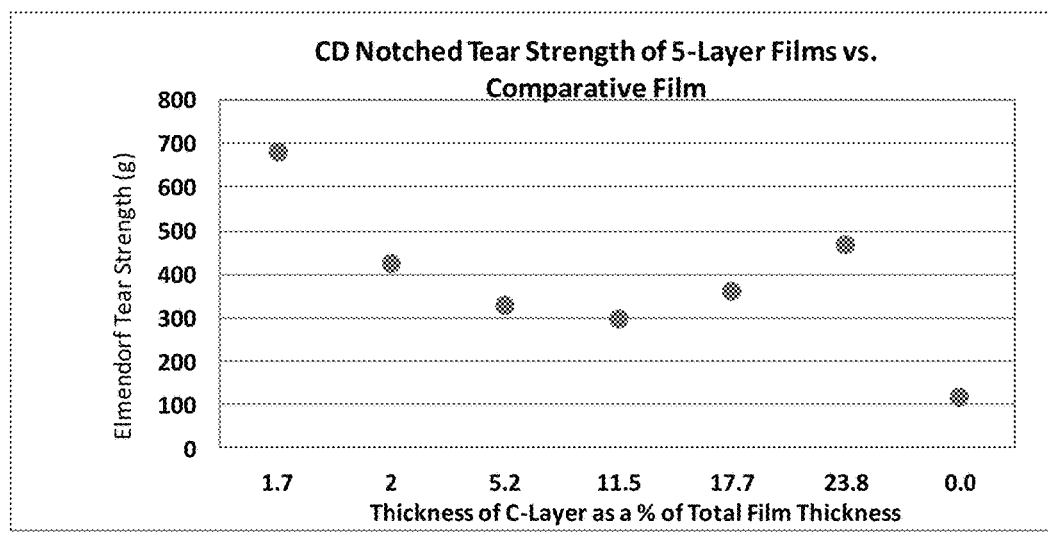
FIG. 4 depicts the cross-direction (CD) notched Elmendorf tear strength in grams (y-axis) vs. the thickness of the C-layer as a percentage of the total film thickness (x-axis) of the films of FIG. 3.

FIG. 3 depicts the MD notched Elmendorf tear strength and FIG. 4 the CD notched Elmendorf tear strength, of the films of Example 4. In both figures, 0% indicates the absence of a C-layer, which corresponds to a comparative 3-layer film having the structure ABA, where the thickness of layer B is substantially the same as the combined thickness of layers BCB. As shown in FIG. 3, at 5.2% and below (not including 0%), the MD notched tear strength is about 400 g and above, or at least twice that of the comparative film (0%). The tear strength increases as the percentage of thickness of Layer C is decreased to 2% and 1.7%. In FIG. 4, the CD notched tear strength is greater than about 300 g for the samples comprising 5.2%, 2% and 1.7% of Layer C. This is about three times greater than the comparative sample at 0%.

These data are surprising and counterintuitive, because the strength of the film actually increases as the thickness of the C-layer decreases. As the C-layer approaches and equals 0%, one would expect the trend to continue and the comparative sample to exhibit even greater strength than the samples having a lower percentage of the C-layer. However, when the C-layer is absent, and therefore equals 0%, the strength of the film is actually decreased. Therefore, the data show that by splitting an inner elastic layer with an inelastic layer that equals about 5% or less than the total thickness, or weight, of the film, the tear strength is increased by at least a factor of 2. The data are summarized in Table 1.

TABLE 1

Split-layer Films Having Structure ABCBA

| Percentage (by weight) of C-layer | Approx. MD Notched Tear Strength (g) | Increase (multiple of comparative film at 0%) | Approx. CD Notched Tear Strength (g) | Increase (multiple of comparative film at 0%) |
|---|---|---|---|---|
| 0 | 200 | — | 100 | — |
| 5.2 | 400 | 2x | 325 | >3x |
| 2 | 500 | 2.5x | 410 | >4x |
| 1.7 | 650 | >3x | 690 | ~7x |

Figure 5:
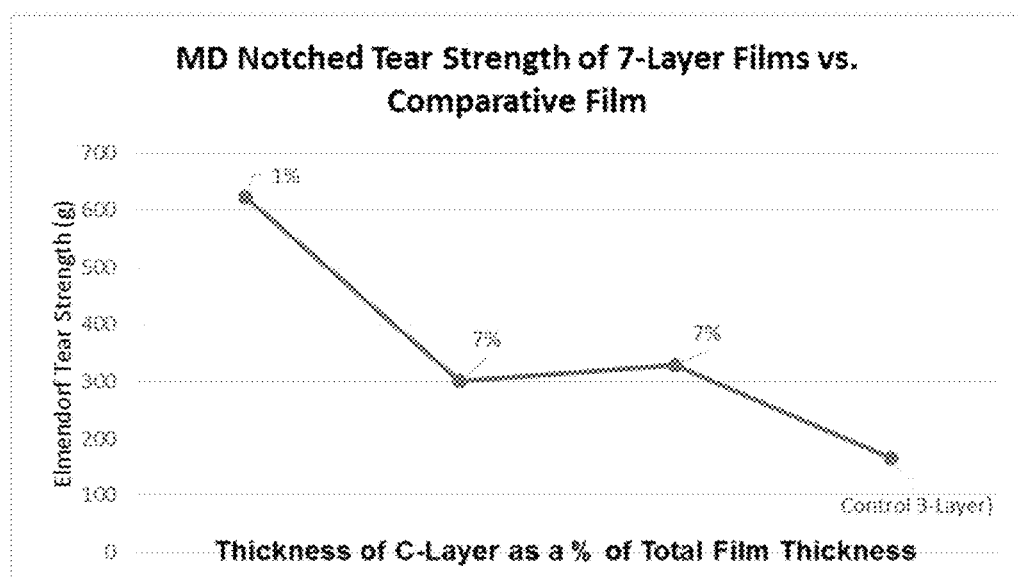
FIG. 5 depicts the MD notched Elmendorf tear strength in grams (y-axis) of split-layer films, as defined herein. Comparative film has 3-layers and the structure ABA, and 7-layer film has the structure ABCBCBA. The thickness of the C-layers each is either 1% or 7% of the total film thickness and is absent (0%) in the comparative film (x-axis).
Figure 6:
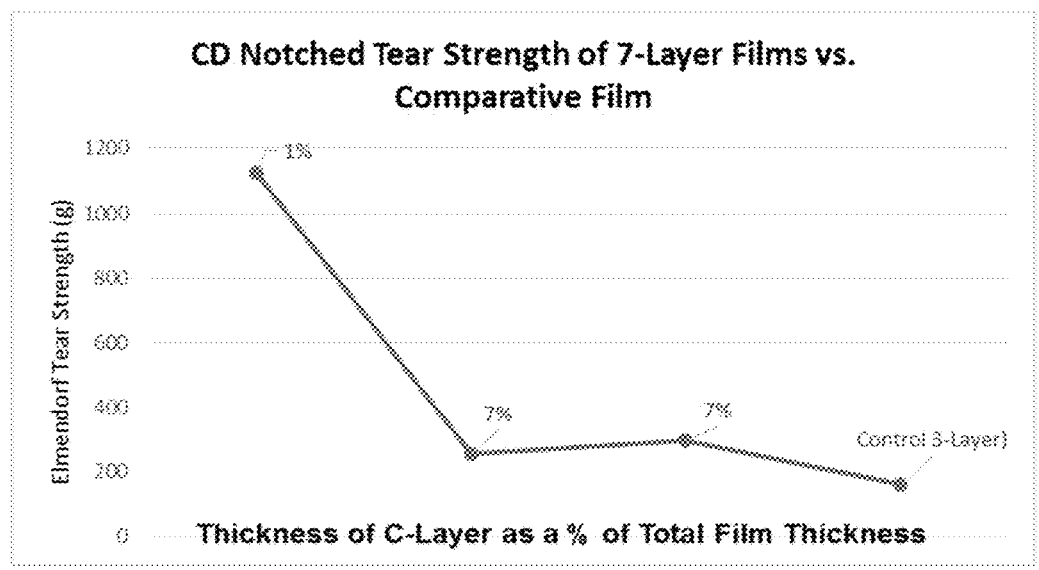
FIG. 6 depicts the CD notched Elmendorf tear strength in grams (y-axis) of the films of FIG. 5.

Example 5: Split-Layer Films Comprising Seven Layers, with Varying Thickness of Inner Layer Three films each having seven layers and the structure ABCBCBA were made. The polymeric composition of the films was as described above for the 5-layer films. The films had a basis weight of about 50 gsm, and the combined basis weight of the BCBCB layers was substantially equal to the basis weight of the B-layer in the comparative film having the structure ABA, or about 44 gsm. In Film 1, the thickness of the C-layers each was about 1%, the A-layers each about 6%, and the B-layers each about 28%. In Films 2B and 3B, the thickness of the C-layers each was about 7%, the A-layers each about 6%, and the B-layers each about 24.6%. The MD- and CD-notched tear strength data are depicted graphically in FIGS. 5 and 6, respectively, and show that the tear strength in both directions is highest for the film having the thinner C-layers. Table 2 below summarizes measured tear strengths.

TABLE 2

Split-layer Films Having Structure ABCBCBA

| % (by weight) of C-layer | Approx. MD Notched Tear Strength (g) | Increase (multiple of comparative film at 0%) | Approx. CD Notched Tear Strength (g) | Increase (multiple of comparative film at 0%) | Approx. MD Un-notched Tear Strength (g) | Increase (multiple of comparative film at 0%) | Approx. CD Un-notched Tear Strength (g) | Increase (multiple of comparative film at 0%) |
|---|---|---|---|---|---|---|---|---|
| 0 | 166 | — | 845 | — | 160 | — | 1318 | — |
| 1 | 622 | 3.7x | 1326 | 1.5x | 1123 | 7 | 1703 | 1.3 |
| 7* | 315 | 1.8x | 1432 | 1.7x | 277 | 1.1 | 1685 | 1.3 |

*Avg of measurements on films 2B and 3B.

These data also are surprising, displaying the same counterintuitive trend as shown with the 5-layer films. The strength of the film actually increases as the thickness of the C-layer decreases. Given that the tear strength is lowest for the film having no C-layer (in other words, the B-layer is not split by an intervening C-layer), one would expect that as the thickness of the C-layer is increased, the strength would increase. What is clear, however, is that thin C-layers, each having a thickness of about 1%, result in superior strength characteristics than thicker C-layers. These and other data not included here show that to produce films having superior strength properties, the thickness of intervening C-layers must be below a threshold, typically of around 5%, of the total film thickness.

In all embodiments of the present invention, all percentages are by weight of the total film weight, unless specifically stated otherwise. All ranges are inclusive and combinable. All numerical amounts are understood to be modified by the word "about" unless otherwise specifically indicated. To the extent that the terms "includes," "including," "contains," or "containing" are used in the specification or the claims, they are intended to be inclusive in a manner similar to the term "comprising" as that term is interpreted when employed as a transitional word in a claim.

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

We claim:

1. A split-layer thermoplastic film comprising:
   a structure A-(B-C)$_n$-B-A, wherein n≥1, A and C are inelastic layers each having a thickness and each comprising individually at least one of polymeric compositions A and C; B is an elastic layer comprising polymeric composition B, and wherein:
   the layers comprising (B-C)$_n$-B have a combined thickness x;
   polymeric compositions A and C comprise an inelastic polymer;
   polymeric composition B comprises an elastomeric polymer; and
   wherein the thickness of C comprises 5% or less of the total thickness of the film; and
   wherein the film has a notched Elmendorf tear strength of at least twice the notched Elmendorf tear strength of a comparative thermoplastic film having the structure A-B-A, wherein A and B comprise substantially the same polymeric compositions A and B as the thermoplastic film, and wherein the B-layer of the comparative thermoplastic film has a thickness y which is substantially equal to x.

2. The film of claim 1, further having a notched Elmendorf tear strength of at least about 300 g.

3. The film of claim 1, wherein the thickness of C comprises 2% or less of the total thickness of the film.

4. The film of claim 3, wherein the notched Elmendorf tear strength is at least three times the notched Elmendorf tear strength of the comparative elastomeric film.

5. The film of claim 3, wherein the notched Elmendorf tear strength is at least about 400 g.

6. The film of claim 1, wherein the thickness of C comprises 1% or less of the total thickness of the film.

7. The film of claim 6, wherein the notched Elmendorf tear strength is at least five times the notched Elmendorf tear strength of the comparative elastomeric film.

8. The film of claim 6, wherein the notched Elmendorf tear strength is at least about 600 g.

9. The film of claim 1, wherein n=1.

10. The film of claim 1, wherein the inelastic polymer is selected from the group consisting of polyolefins, styrenic polymers, acrylic polymers, polyamides, and mixtures thereof.

11. The film of claim 10, wherein the polyolefin is selected from the group consisting of polyethylene, polypropylene, linear low density polyethylene, low density polyethylene, high density polyethylene, homopolymers thereof, copolymers thereof, and mixtures thereof.

12. The film of claim 1, wherein the elastomeric polymer comprises styrenic block copolymers, elastomeric olefinic block copolymers, or a mixture thereof.

13. The film of claim 12, wherein the styrenic block copolymer is selected from the group consisting of styrene-butadiene-styrene, styrene-isoprene-styrene, styrene-ethylene-butylene-styrene, styrene-ethylene-propylene, styrene-ethylene-propylene-styrene, styrene-ethylene-ethylene-propylene-styrene, polystyrene, high impact polystyrene, and mixtures thereof.

14. The film of claim 1, further having a basis weight of from about 10 gsm to about 50 gsm.

15. The film of claim 1, further having a permanent set of less than about 20%.

16. A split-layer thermoplastic film comprising:
   a structure A-(B-C)$_n$-B-A, wherein A and C are inelastic layers each having a thickness and each comprising individually at least one of polymeric compositions A and C; B is an elastic layer comprising polymeric composition B, and n is 1 or 2, and wherein:
   the layers comprising (B-C)$_n$-B have a combined thickness x;

said polymeric compositions A and C comprise a polyolefin selected from the group consisting of polyethylene, polypropylene, or homopolymers, copolymers and combinations thereof;

said polymeric composition B comprises styrenic block copolymers, elastomeric olefinic block copolymers, and mixtures thereof; and wherein the thickness of C comprises 5% or less of the thickness of the film; and wherein the film has a notched Elmendorf tear strength of at least twice the notched Elmendorf tear strength of a comparative thermoplastic film having the structure ABA, wherein A and B comprise substantially the same polymeric compositions A and C as the thermoplastic film, and wherein the B-layer of the comparative thermoplastic film has a thickness y which is substantially equal to x.

17. The film of claim 16, wherein the notched Elmendorf tear strength is at least about 300 g.

18. The film of claim 16, further having a basis weight of from about 10 gsm to about 50 gsm and a permanent set of less than about 20%.

19. The film of claim 1, further comprising at least one substrate laminated to a surface of the film to form an elastomeric laminate.

20. The film of claim 19, wherein the substrate is bonded to the surface of the film by adhesive bonding, ultrasonic bonding, or a combination thereof.

21. The film of claim 16, further comprising at least one substrate laminated to a surface of the film to form an elastomeric laminate, wherein the substrate is bonded to the surface of the film by adhesive bonding, ultrasonic bonding, or combinations thereof.

22. A split-layer thermoplastic film comprising:
a structure $A\text{-}(B\text{-}C)_n\text{-}B\text{-}A$, wherein $n=2$, A and C are inelastic layers each having a thickness and each comprising individually at least one of polymeric compositions A and C; B is an elastic layer comprising polymeric composition B, and wherein:

the layers comprising $(B\text{-}C)_n\text{-}B$ have a combined thickness x;

polymeric compositions A and C comprise an inelastic polymer;

polymeric composition B comprises an elastomeric polymer; and wherein the thickness of C comprises 5% or less of the total thickness of the film; and wherein the film has a notched Elmendorf tear strength of at least twice the notched Elmendorf tear strength of a comparative thermoplastic film having the structure A-B-A, wherein A and B comprise substantially the same polymeric compositions A and B as the thermoplastic film, and wherein the B-layer of the comparative thermoplastic film has a thickness y which is substantially equal to x.

* * * * *